US008823742B2

(12) United States Patent
Kweon

(10) Patent No.: US 8,823,742 B2
(45) Date of Patent: Sep. 2, 2014

(54) METHOD OF SIMULATING LENS USING AUGMENTED REALITY

(75) Inventor: Hyuk Je Kweon, Gwacheon-si (KR)

(73) Assignee: Viewitech Co., Ltd., Gyeonggi-do (KR)

( * ) Notice: Subject to any disclaimer, the term of this patent is extended or adjusted under 35 U.S.C. 154(b) by 268 days.

(21) Appl. No.: 13/526,612

(22) Filed: Jun. 19, 2012

(65) Prior Publication Data

US 2013/0286045 A1 Oct. 31, 2013

(30) Foreign Application Priority Data

Apr. 27, 2012 (KR) ........................ 10-2012-0044226

(51) Int. Cl.
G09G 5/00 (2006.01)
G06T 19/00 (2011.01)
(52) U.S. Cl.
CPC .................................. G06T 19/006 (2013.01)
USPC ....................................................... 345/633
(58) Field of Classification Search
CPC ................................................... G06T 19/006
USPC ....................................................... 345/633
See application file for complete search history.

(56) References Cited

U.S. PATENT DOCUMENTS

| 7,889,212 B2* | 2/2011 | Schulz et al. ................. 345/660 |
| 2012/0122570 A1* | 5/2012 | Baronoff ......................... 463/31 |
| 2012/0200667 A1* | 8/2012 | Gay et al. ........................ 348/43 |

OTHER PUBLICATIONS

Looser et al.; Through the looking glass: the use of lenses as an interface tool for Augmented Reality interfaces; 2004; ACM.*
Viega et al.; 3D Magic Lenses; 1996; ACM.*

* cited by examiner

*Primary Examiner* — David T Welch
(74) *Attorney, Agent, or Firm* — The PL Law Group, PLLC

(57) ABSTRACT

In a method of simulating a lens using augmented reality, a user who desires to purchase a vision correction product may wear lenses precisely corrected using a computer device through a virtual experience, and inconvenience of frequently replacing various lenses when taking an eye examination is considerably mitigated. An effect of wearing a variety of vision correction products in a short time period can be experienced, and it is expected to be able to select an optimized custom-tailored vision correction product. Particularly, in manufacturing a functional lens which has complicated manufacturing steps and requires a precise examination, such as a progressive multi-focal lens, a coating lens, a color lens, a myopia progress suppression lens, an eye fatigue relieve lens or the like, it is expected that a precise product can be manufactured, and manufacturing time can be greatly reduced.

20 Claims, 17 Drawing Sheets

METHOD OF SIMULATING LENS USING AUGMENTED REALITY

CROSS-REFERENCES TO RELATED APPLICATIONS

This application claims priority to Korean Patent Application No. 10-2012-0044226, filed on Apr. 27, 2012, which is incorporated herein by reference in its entirety

BACKGROUND

1. Field of the Invention

The present invention relates to a method of simulating a lens using augmented reality for virtual experience.

2. Description of the Related Art

In the case of conventional vision correction products, it is general that information on prescription for eyesight of a wearer such as lens power, astigmatism, distance between eyes, and other information are grasped, and appropriate lenses are selected based on the grasped information using previously manufactured eye examination lenses. However, the process of grasping the information on prescription for eyesight of a wearer and manufacturing lenses is very complicated and inconvenient and requires a considerably precise work. For example, even after information on the eyesight of a wearer is grasped by a medical expert, appropriate lenses are selected separately using various kinds of measurement devices. In this case, if the selected lenses are inappropriate, previously manufactured lenses should be discarded, and appropriate lenses need to be manufactured additionally. Particularly, such a problem is further severe in the process of manufacturing functional lenses of a complex structure, such as progressive lenses, multi-focal lenses, myopia progress suppression lenses, eye fatigue relieve lenses, photochromic lenses, polarizing lenses and the like. In order to solve the problem, the present inventor has invented a method of simulating a lens using augmented reality, in which the process of manufacturing the lens is simplified, and precision of the lens and convenience of lens consumers are considerably improved.

SUMMARY OF THE INVENTION

Accordingly, the present invention has been made in view of the above-mentioned problems occurring in the prior art, and it is an aspect of the present invention to provide a method of simulating a lens using augmented reality, in which the existing process of manufacturing the lens is simplified, and precision of the lens and, furthermore, convenience of lens consumers are considerably improved.

According to an aspect of the present invention, there is provided a method of simulating a lens using augmented reality, which uses a portable tablet computer applied with a screen module having an input and out function, a camera module for photographing surrounding environments in real-time, a motion sensor module for sensing a motion pattern according to handling of a user, and an operation module for storing and/or processing information received from the screen module, the camera module and the motion sensor module, the method including: acquiring information on an image of a real surrounding environment by photographing the real surrounding environment using the camera module; acquiring information on a motion of visually recognizing an object of the user by sensing a motion pattern according to handling of the user through the motion sensor module; creating a virtual custom-tailored lens image based on the information on the motion of visually recognizing an object of the user through the operation module; and disposing the virtual custom-tailored lens image to be overlapped with the real surrounding environment image and outputting a vision adjustment effect image based on the virtual custom-tailored lens image.

In an embodiment of the present invention, the acquisition of the information on a motion of visually recognizing an object of the user may include: acquiring information on a distance between eyes of the user and the portable tablet computer by sensing a motion pattern of the user approaching the eyes of the user toward a direction of the portable tablet computer or pulling the portable tablet computer toward a direction of the eyes of the user in order to confirm an image outputted on the screen module; and acquiring information on a position of a face of the user by sensing a motion pattern of the user moving the face of the user up and down or left and right in order to confirm an image outputted on the screen module.

In addition, the virtual custom-tailored lens image may be implemented in a form of two-dimension 2D or three-dimension 3D.

In addition, the virtual custom-tailored lens image may be selected from a group of a progressive lens image, a progressive multi-focal lens image, a spherical lens image, an aspherical lens image, a double-sided aspherical lens image, a myopia progress suppression lens image, an eye fatigue relieve lens image, a color lens image, and a coating lens image.

In addition, the outputting of the vision adjustment effect image based on the virtual custom-tailored lens image may further include outputting a virtual background image or a function handling button image stored in the portable tablet computer.

In addition, the portable tablet computer may be additionally applied with an optical sensor module.

In addition, the optical sensor module may be implemented in an embedded type embedded in the portable tablet computer or implemented in an external type connected to an audio connection port of the portable tablet computer.

In addition, the method of simulating a lens using augmented reality may further include: acquiring information on external light by sensing the external light through the optical sensor module; and creating the virtual custom-tailored lens image based on the information on external light through the operation module.

In addition, the virtual custom-tailored lens image may be a discoloration lens image or a polarization lens image.

According to another aspect of the present invention, a method of simulating a lens using augmented reality, may include: acquiring first information on an image photographed by a camera module; acquiring second information on a motion of visually recognizing an object of a user by sensing a motion pattern according to handling of the user, with a motion sensor module; creating a virtual custom-tailored lens image based on the second information by an operation module; and disposing the virtual custom-tailored lens image to be overlapped with the image photographed by the camera module to make a vision adjustment effect image and outputting the vision adjustment effect image on a screen module.

At least one of the camera module, the motion sensor module, the operation module and the screen module may be drivably connected to a tablet. Alternatively, the camera module, the motion sensor module, the operation module and the screen module may be embedded in a tablet.

The acquisition of the second information may include outputting an image on the screen module; and acquiring the second information on a distance between eyes of the user and the screen module by sensing a motion pattern of the user when the user moves himself or herself or moves the screen module in order to confirm the image outputted on the screen module.

The acquisition of the second information may include: outputting an image on the screen module; and acquiring the second information on a position of a face of the user by sensing a motion pattern of the user when the user moves the face of the user in order to confirm an image outputted on the screen module.

The second information may include information on an eye rotation and a length of corridor motion pattern.

The lens may be a spectacle lens or a contact lens.

The virtual custom-tailored lens image may include a plurality of the virtual custom-tailed lens images selected from a group of a progressive lens image, a progressive multi-focal lens image, a spherical lens image, an aspherical lens image, a double-sided aspherical lens image, a myopia progress suppression lens image, an eye fatigue relieve lens image, a color lens image, and a coating lens image.

DETAILED DESCRIPTION OF EXEMPLARY EMBODIMENTS

Hereinafter, embodiments according to the present invention will be described in detail with reference to the attached drawings. As used herein, the term "and/or" includes any and all combinations of one or more of the associated listed items. Expressions such as "at least one of," when preceding a list of elements, modify the entire list of elements and do not modify the individual elements of the list. As used herein, the term "lens" includes a spectacle lens and a contact lens. The lens may be a corrective lens or a lens for sunglasses.

Figure 1:
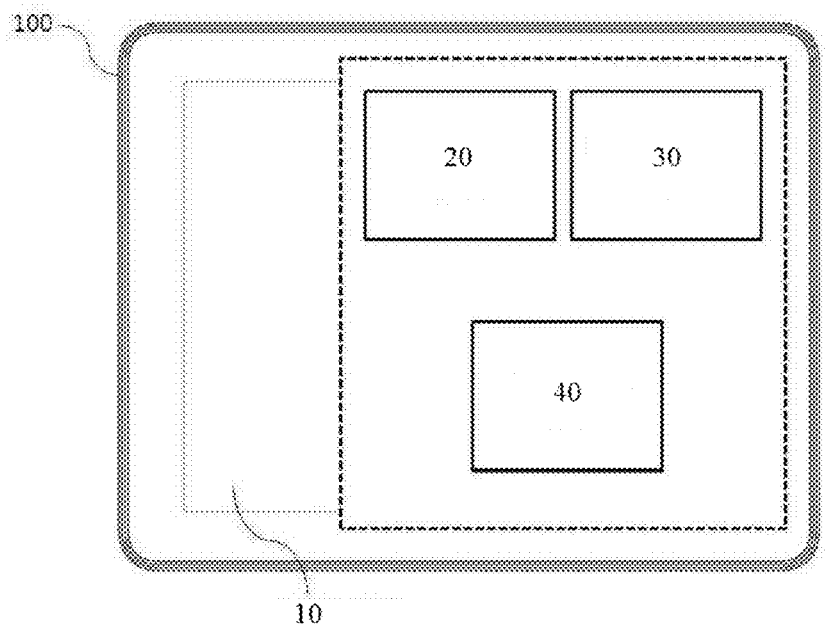
FIGS. 1 and 2 are views showing modules of a portable tablet computer required to implement an embodiment of the present invention.
Figure 2:
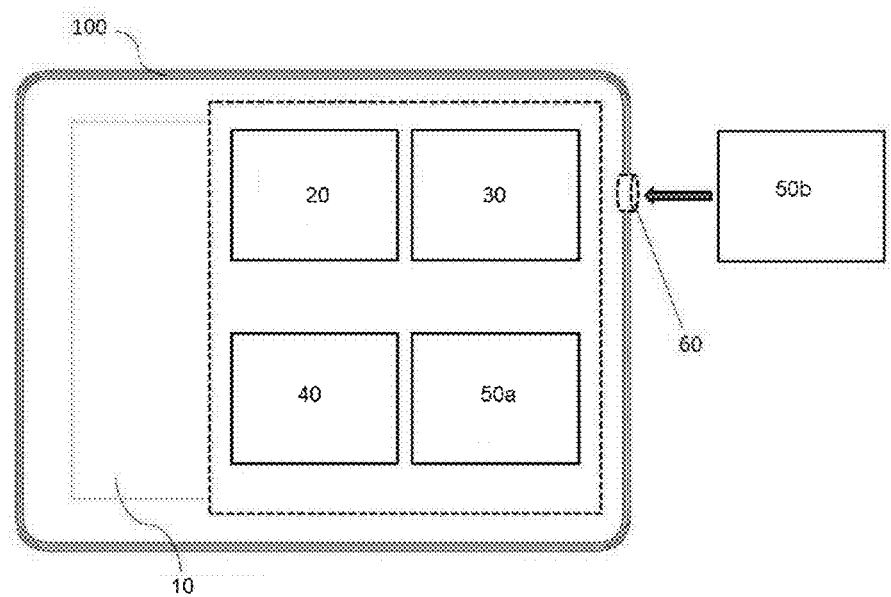

FIGS. 1 and 2 are views showing modules of a portable tablet computer required to implement an embodiment of the present invention.

According to FIG. 1, a method of simulating a lens such as a spectacle lens or a contact lens using augmented reality according to an embodiment of the present invention is based on a portable tablet computer 100. The portable tablet computer 100 is a touch screen based portable computer such as a tablet based on iOS such as iPad, a tablet based on Android OS such as Galaxy tab, a tablet based on Windows, or the like.

In an embodiment of the present invention, although the portable tablet computer 100 can be diversely selected, it is assumed that the portable tablet computer 100 includes all kinds of apparatuses applied with a screen module 10 having at least an input and output function, a camera module 20 for photographing surrounding environments in real-time, a motion sensor module 30 for sensing a motion pattern according to handling of a user, and an operation module 40 for storing and/or processing information received from the motion sensor module. The word "applied" includes a case of drivably connecting at least one or more modules to the portable tablet computer 100 so that each function can be implemented in the portable tablet computer 100, as well as a case where the screen module 10, the camera module 20, the motion sensor module 30 and the operation module 40 are embedded in the portable tablet computer 100 and perform a function.

For example, the screen module 10 has at least an input and output function operated by handling of a user and is generally disposed on the front surface of the portable tablet computer 100. However, if it needs to enlarge a screen or output an image on a display device installed in another space, an external screen can be driven in connection with the portable tablet computer 100.

The camera module 20 is capable of photographing surrounding environments in real-time and is generally disposed at a portion of the front or rear surface of the portable tablet computer 100. However, when it needs to photograph a further precise image or photograph an image using a camera specialized for eye examination, an external camera module may be driven in connection with the portable tablet computer 100.

The motion sensor module 30 is a module capable of sensing a motion pattern according to handling of a user when the user performs a certain motion while possessing the portable tablet computer 100. For example, there is an acceleration sensor, and the acceleration sensor may sense parameters such as a distance between the user and the portable tablet computer 100, a slope and the like by sensing up and down motions or left and right motions (up and down or left and right motions of the portable tablet computer corresponding thereto).

The operation module 40 is a module which can store and/or process information inputted from the screen module 10, the camera module 20 and the motion sensor module 30, and in addition, the operation module 40 may store and/or process information stored in the portable tablet computer 100 or information received through a short distance or a long distance communication network. In this specification, the operation module 40 creates a custom-tailored spectacle lens image by processing the information acquired through the screen module 10, the camera module 20 and the motion sensor module 30 and other information previously stored to manufacture custom-tailored spectacle lenses, and, furthermore, creates an augmented reality image where a virtual custom-tailored spectacle lens image is disposed to be overlapped with an image of a real surrounding environment.

According to FIG. 2, the portable tablet computer 100 can be additionally applied with an optical sensor 50a, 50b. The optical sensor 50a, 50b generally refers to all kinds of sensors that can sense the amount of external light (intensity of light), i.e., the amount of external light in a visible ray region, an ultraviolet ray region or an infrared ray region. The optical sensor can be implemented in an embedded type 50a embedded in the portable tablet computer 100 and/or an external type 50b connected to a certain connection port of the portable tablet computer 100, e.g., an audio connection port 60 or the like. The optical sensor 50a, 50b may include a power supply of its own or can be provided with power from the portable tablet computer 100.

Figure 3:
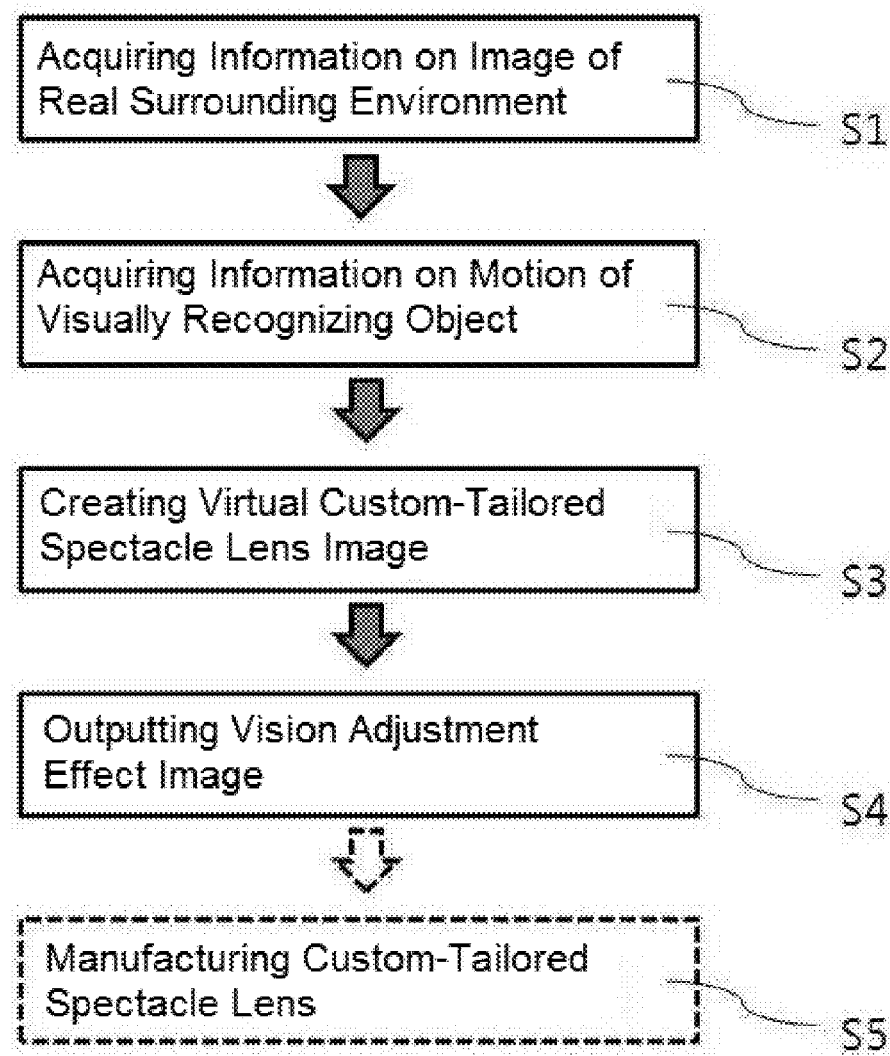
FIGS. 3 and 4 are flowcharts illustrating a series of steps for implementing a method of simulating a spectacle lens using augmented reality according to an embodiment of the present invention.
Figure 4:
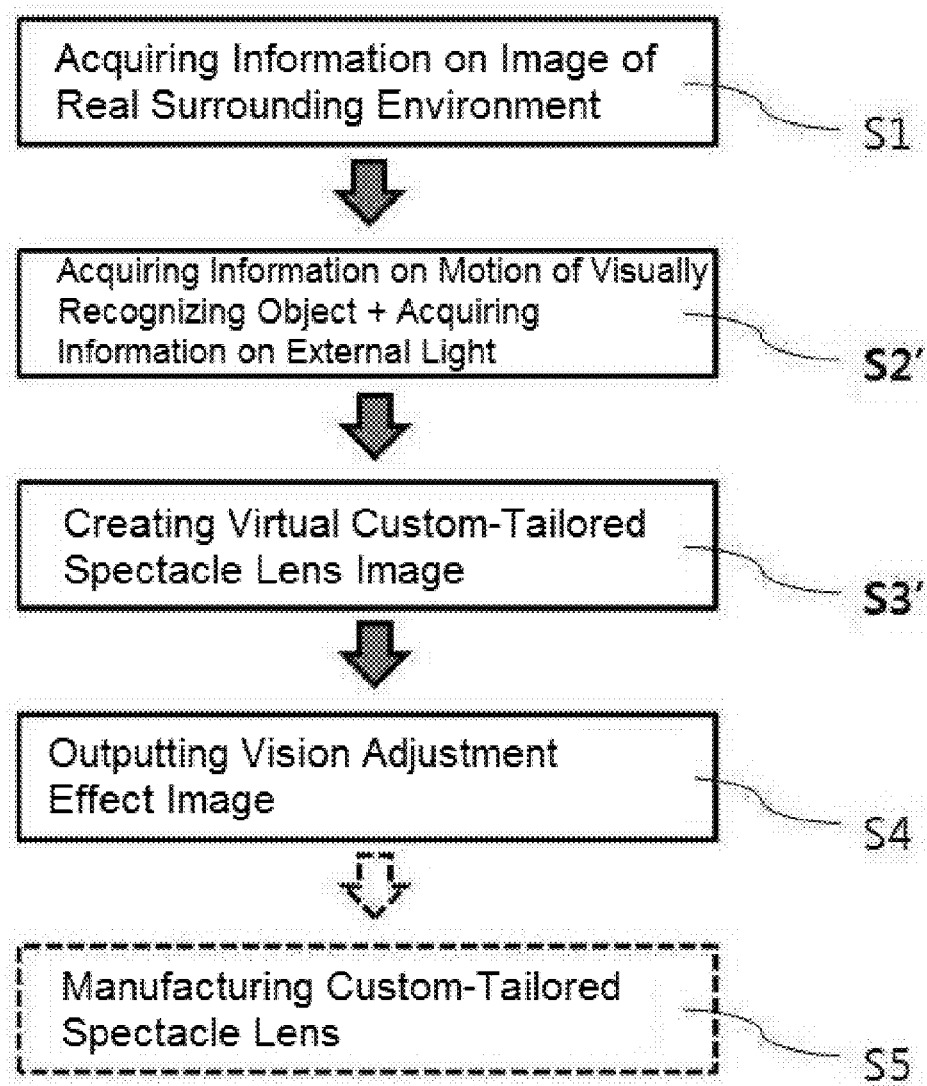

FIGS. 3 and 4 are flowcharts illustrating a series of steps for implementing a method of simulating a spectacle lens using augmented reality according to an embodiment of the present invention. According to FIG. 3, the method of simulating a spectacle lens using augmented reality according to an embodiment of the present invention may be roughly divided into four steps (S1 to S4). According to FIG. 4, the method according to FIG. 3 may include some additional steps in a second step S2 and a third step S3. In addition, the method of simulating a spectacle lens using augmented reality according to an embodiment of the present invention can be associated with the step of manufacturing a custom-tailored spectacle lens S5.

Figure 5:
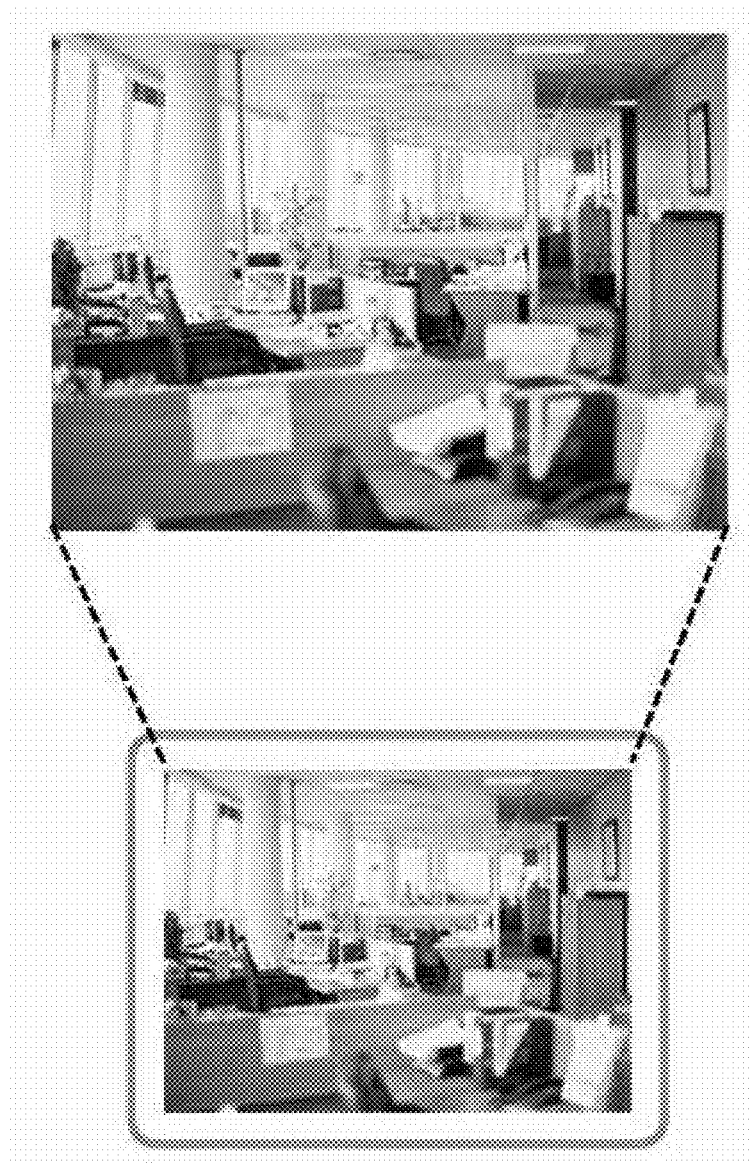
FIG. 5 is a view illustrating the step of acquiring information on an image of a real surrounding environment S1 for implementing an embodiment of the present invention.

The first step S1 is a step of acquiring information on an image of a real surrounding environment by photographing the real surrounding environment using the camera module 20 of the portable tablet computer 100 (refer to FIG. 5). In this case, the information on an image of a real surrounding environment includes information on a moving image of a real surrounding environment photographed in real-time, as well as information on an image of the real surrounding environment photographed previously. The information on an image of a real surrounding environment can be temporarily or permanently stored in the operation module 40 and processed as needed.

The second step is a step of acquiring information on a motion of visually recognizing an object of a user 1 by sensing a motion pattern according to handling of the user through the motion sensor module 30 of the portable tablet computer 100. The motion sensor module 30 may sense various motion patterns of the user 1, particularly, motion patterns of the face of the user 1 (including the eyes or around the eyes). For example, the motion sensor module 30 may acquire information on a distance between the eyes of the user 1 and the portable tablet computer 100 by sensing a motion pattern of the user 1 approaching the eyes of the user 1 toward the direction of the portable tablet computer 100 or pulling the portable tablet computer 100 toward the direction of the eyes of the user 1 in order to confirm an image (an image of focus "+") outputted on the screen module 10. In this case, the information on the distance between the eyes of the user 1 and the portable tablet computer 100 is categorized into, for example, a short distance, a medium distance and a far distance and can be used as base data for manufacturing a custom-tailored spectacle lens image of the user 1 applied with a refractive power (short-sightedness, astigmatism, far-sightedness, presbyopia, addition, axis, etc). In addition, the motion sensor module 30 may acquire information on the position of the face of the user 1 by sensing a motion pattern of the user 1 moving the face of the user 1 up and down or left and right (i.e., referred to as a "viewing habit of a user" or a "reading habit of a user") in order to confirm an image (an image of focus "+") outputted on the screen module 10. In this case, information on the angle of bending the head of the user can be obtained by sensing a motion pattern of moving the face of the user 1 up and down, and information on the angle of horizontal movement of the head of the user 1 can be obtained by sensing a motion pattern of moving the face of the user 1 left and right. Furthermore, information on the eye rotation and the length of corridor of the user 1 can be obtained by comprehensively considering the information described above, and the obtained information can be used as base data for manufacturing a custom-tailored spectacle lens image of the user 1 applied with a pattern of a viewing habit (a reading habit) of the user 1.

The second step may further include the step of acquiring information on external light S2' by sensing the external light through the optical sensor 50a, 50b. As described above, the portable tablet computer 100 according to an embodiment of the present invention can be additionally applied with the optical sensor 50a, 50b (refer to FIG. 2), and the optical sensor 50a, 50b may acquire information the external light by sensing the external light, and this information can be used as base data for manufacturing a custom-tailored spectacle lens image of the user 1 applied with discoloration or polarization.

Figure 6:
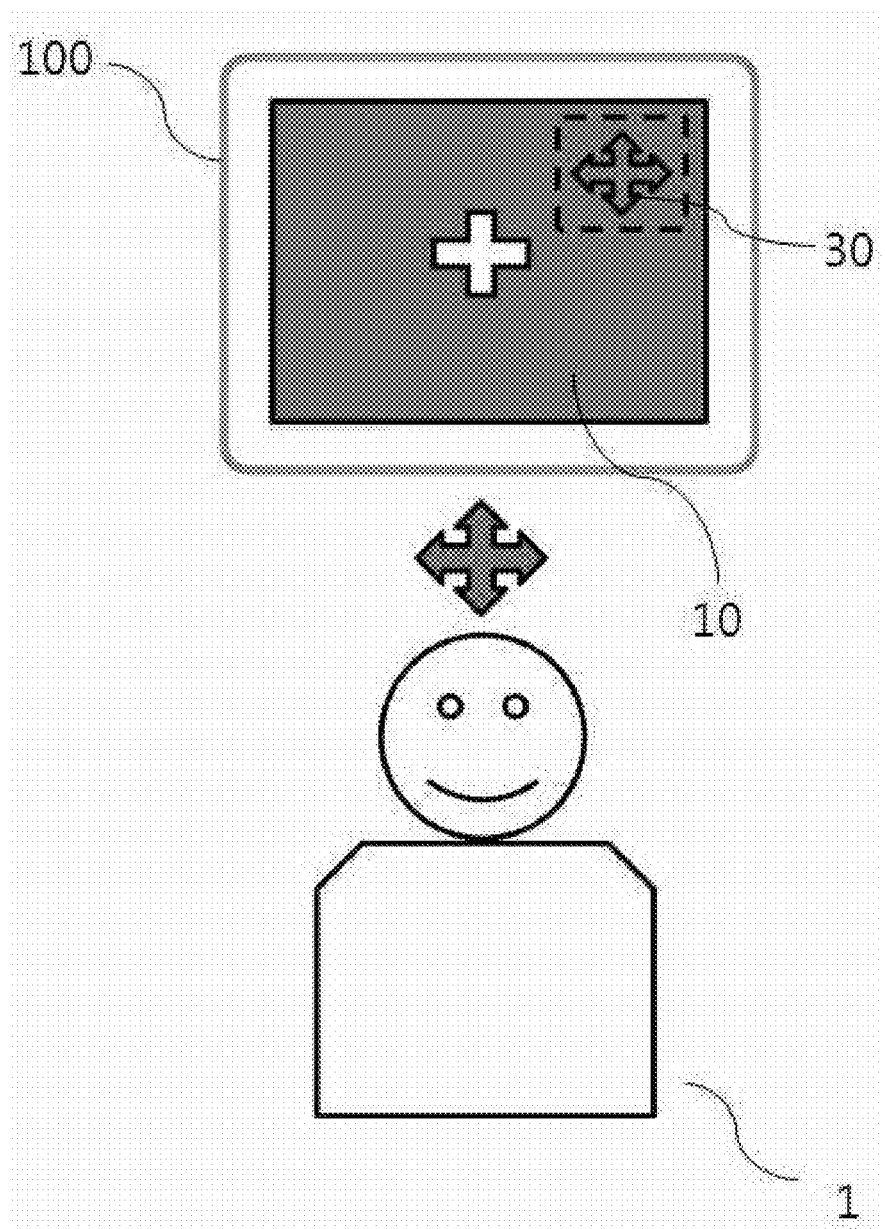
FIG. 6 is a view illustrating the step of acquiring information on a motion of visually recognizing an object S2 for implementing an embodiment of the present invention.
Figure 7:
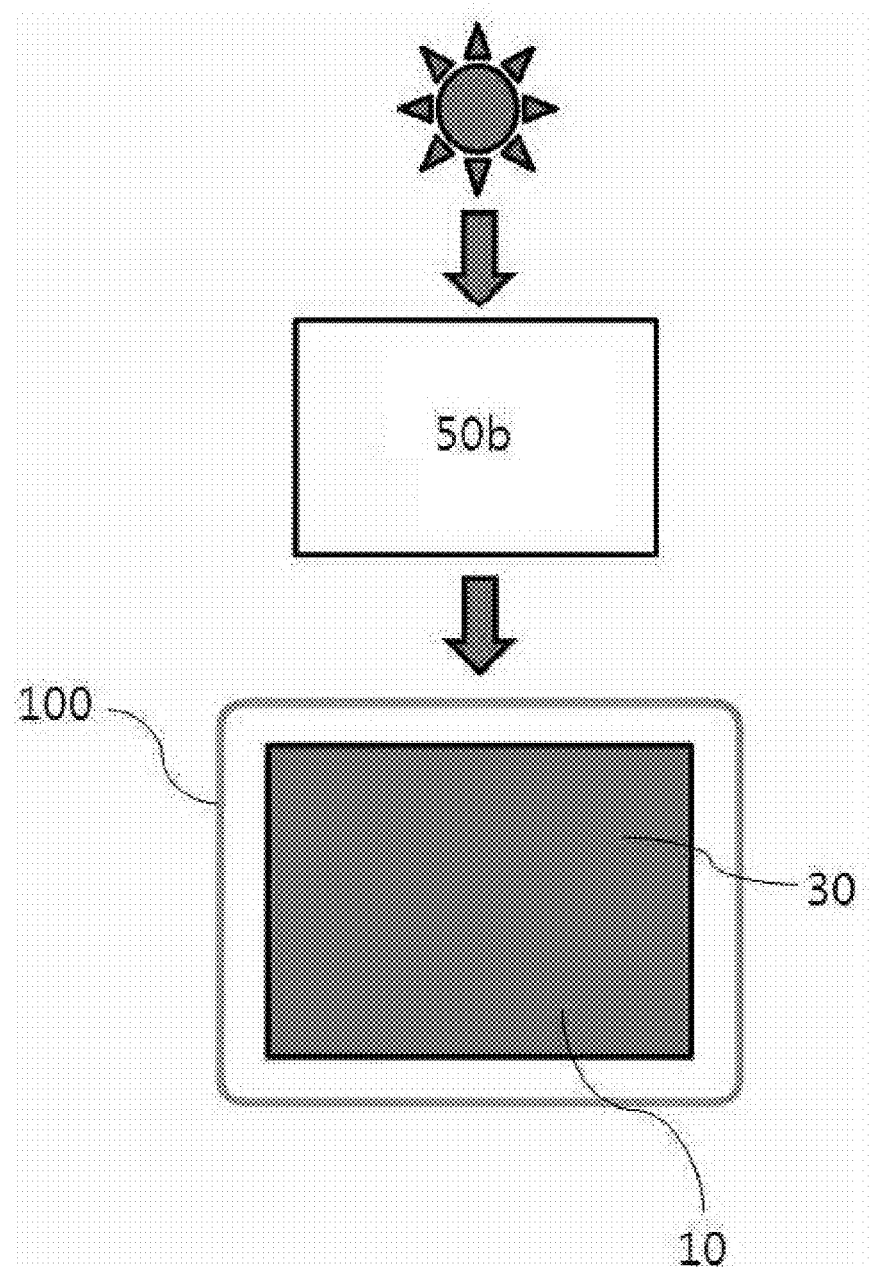
FIG. 7 is a view illustrating the step of acquiring information on external light S2' for implementing an embodiment of the present invention.

FIG. 6 is a view illustrating the step of acquiring information on a motion of visually recognizing an object S2 for implementing an embodiment of the present invention, and FIG. 7 is a view illustrating the step of acquiring information on external light S2' for implementing an embodiment of the present invention. It is apparent that the information on a motion of visually recognizing an object and the information on the external light can be used as base data, individually or in combination, for creating a virtual custom-tailored spectacle lens image which will be described below in detail.

Figure 8:
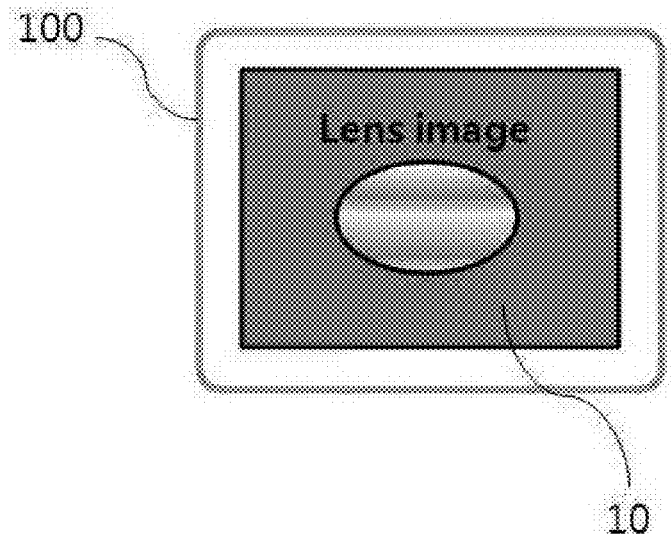
FIG. 8 is a view illustrating the step of creating a virtual custom-tailored spectacle lens image S3 for implementing an embodiment of the present invention.

The third step S3 is a step of creating a virtual custom-tailored spectacle lens image based on the information on the motion of visually recognizing an object of a user through the operation module 40. The third step S3 may further include the step of creating a virtual custom-tailored spectacle lens image S3' based on the information on the external light through the operation module 40. The custom-tailored spectacle lens image is processed and created by the operation module 40 based on the information on the motion of visually recognizing an object and/or the information on the external light described above, and one or more custom-tailored spectacle lens images can be selectively outputted through the screen module 10. The custom-tailored spectacle lens image can be implemented in the form of two-dimension 2D or three-dimension 3D as needed. Accordingly, the custom-tailored spectacle lens image can be implemented in a progressive lens image, a progressive multi-focal lens image, a spherical lens image, an aspherical lens image, a double-sided aspherical lens image, a myopia progress suppression lens image, an eye fatigue relieve lens image, a color lens image, a coating lens image, a discoloration lens image, a polarization lens image or the like depending on the state of eyesight of the user. FIG. 8 is a view illustrating the step of creating a virtual custom-tailored spectacle lens image S3 for implementing an embodiment of the present invention.

The fourth step S4 is a step of disposing the virtual custom-tailored spectacle lens image to be overlapped with the real surrounding environment image on the screen module 10 and outputting a vision adjustment effect image based on the virtual custom-tailored spectacle lens image. That is, the fourth step S4 is a step of implementing an augmented reality image where the virtual custom-tailored spectacle lens image is overlapped with the real surrounding environment image. The vision adjustment effect image is an image that is the same as a vision correction state attained when a user wears a real vision correction product, such as eye glasses, soft lenses or hard lenses, manufactured based on the state of eyesight of the user. That is, the augmented reality image according to an embodiment of the present invention disposes the virtual custom-tailored spectacle lens image to be overlapped with the real surrounding environment image through the screen module 10 and outputs a vision adjustment effect image based on the virtual custom-tailored spectacle lens image. Therefore, a situation that is the same as wearing a real vision correction product is produced, and the user may perform a virtual experience.

Figure 9:
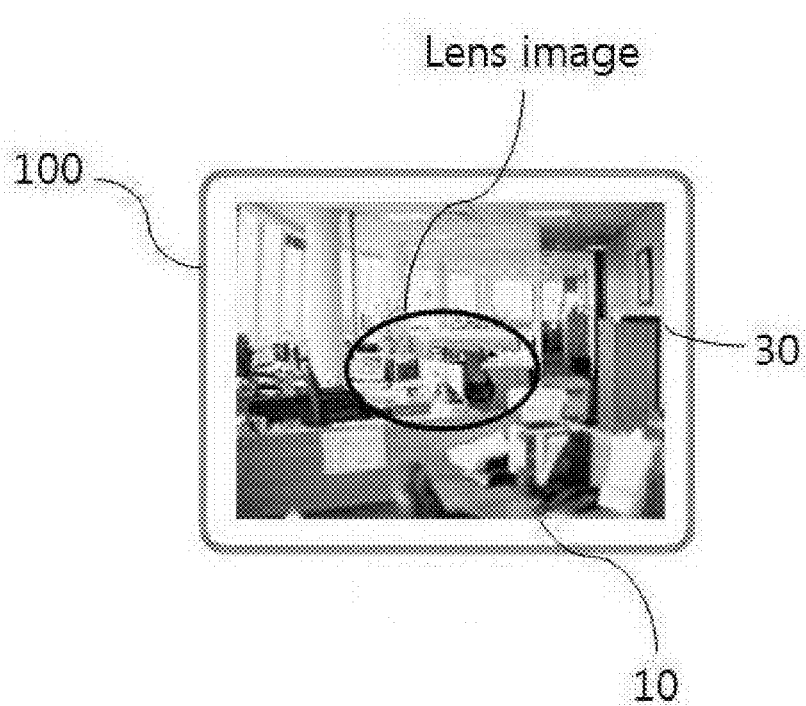
FIG. 9 is a view illustrating the step of outputting a vision adjustment effect image S4 for implementing an embodiment of the present invention.

FIG. 9 is a view illustrating the step of outputting a vision adjustment effect image S4 for implementing an embodiment of the present invention. The step of outputting a vision adjustment effect image based on the virtual custom-tailored spectacle lens image S4 may include the step of additionally outputting a virtual background image or a function handling button image stored in the portable tablet computer 100. In this case, the user may confirm an augmented reality image where the virtual custom-tailored spectacle lens image is disposed to be overlapped with a background of a previously manufactured virtual background image as well as a real surrounding environment image, and efficiency of eye examination can be doubled by handling, e.g., selecting, handling, comparing, or enlarging/reducing a specific image, a variety of virtual custom-tailored spectacle lens images or background images through the screen module 10.

Figure 10:
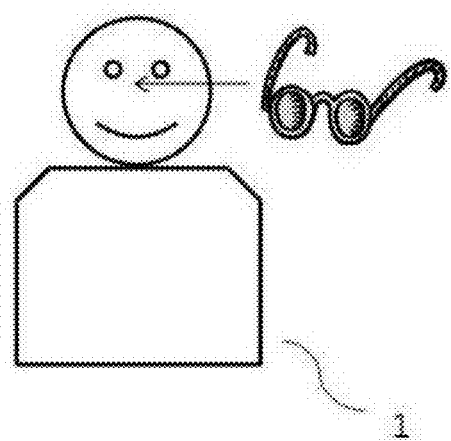
FIG. 10 is a view illustrating an optional step of manufacturing a custom-tailored spectacle lens S5 using a simulation method according to an embodiment of the present invention.

The fifth step S5 is an optional and additional step of manufacturing a custom-tailored spectacle lens corresponding to a selected virtual custom-tailored spectacle lens image if the virtual custom-tailored spectacle lens image is selected by the user who has confirmed the outputted vision adjustment effect image. FIG. 10 is a view illustrating an optional step of manufacturing a custom-tailored spectacle lens using a simulation method S5 according to an embodiment of the present invention.

By passing through the steps described above, a user who desires to purchase a vision correction product may wear spectacle lenses precisely corrected using a computer device through a virtual experience, and inconvenience of frequently replacing various spectacle lenses when taking an eye examination is considerably mitigated. An effect of wearing a variety of vision correction products in a short time period can be experienced, and it is expected to be able to select an optimized custom-tailored vision correction product. Particularly, in manufacturing a functional spectacle lens which has complicated manufacturing steps and requires a precise examination, such as a progressive multi-focal lens, a coating lens, a color lens, a myopia progress suppression lens, an eye fatigue relieve lens or the like, it is expected that a precise product can be manufactured, and manufacturing time can be greatly reduced.

Figure 11:
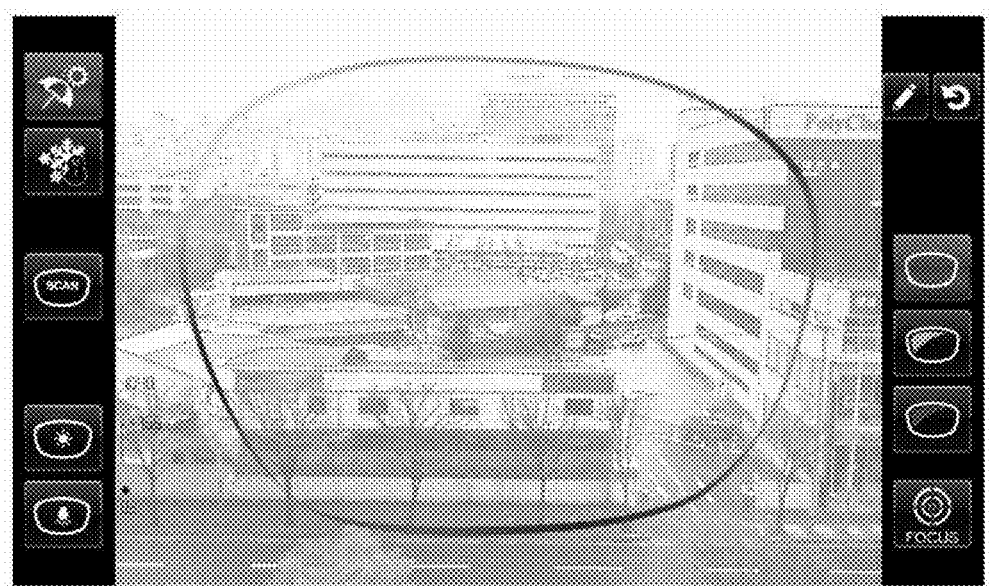
FIG. 11 is a view showing an output state of an augmented reality image where an image of a general lens is disposed to be overlapped with a background image of a real surrounding environment.
Figure 12:
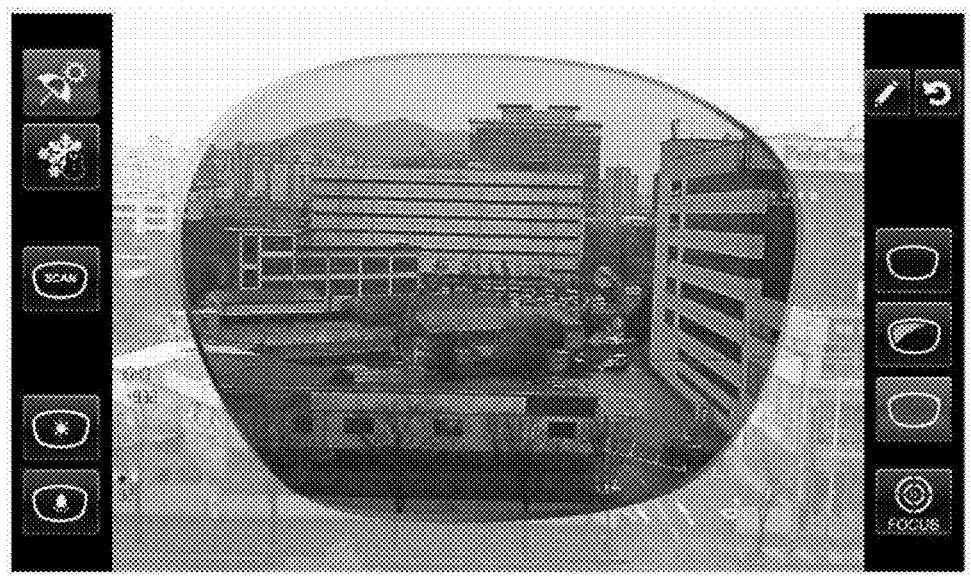
FIG. 12 is a view showing an output state of an augmented reality image where an image of a photochromic lens is disposed to be overlapped with a background image of a real surrounding environment.
Figure 13:
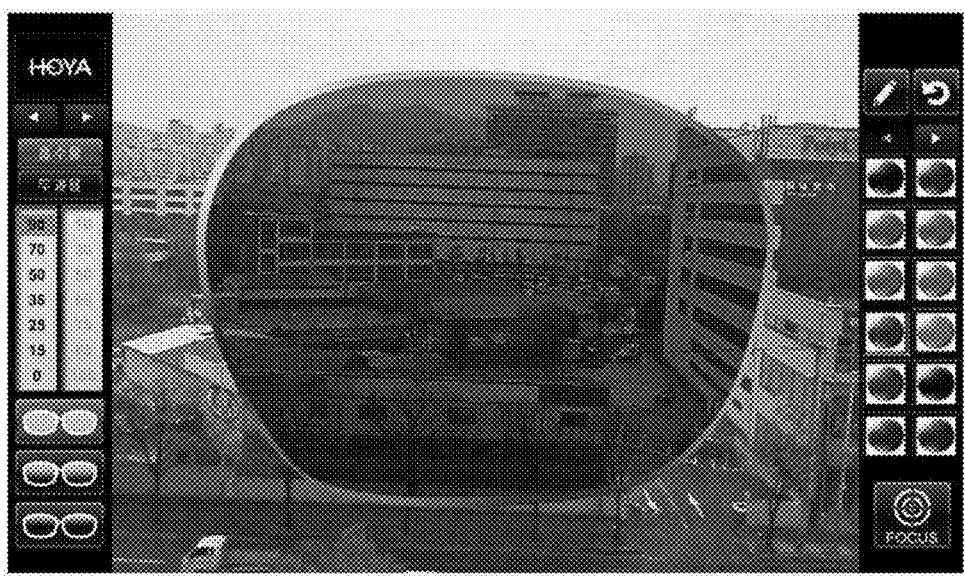
FIGS. 13 to 21 are views showing output states of an augmented reality image where an image of a photochromic lens applied with all or some of gradation effects is disposed to be overlapped with a background image of a real surrounding environment.
Figure 14:
Figure 15:
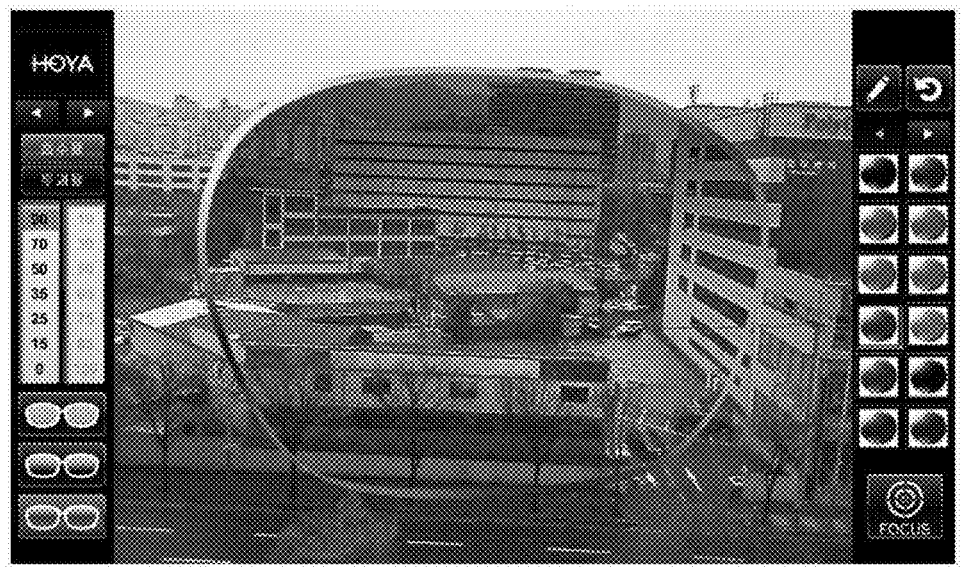
Figure 16:
Figure 17:
Figure 18:
Figure 19:
Figure 20:
Figure 21:
Figure 22:
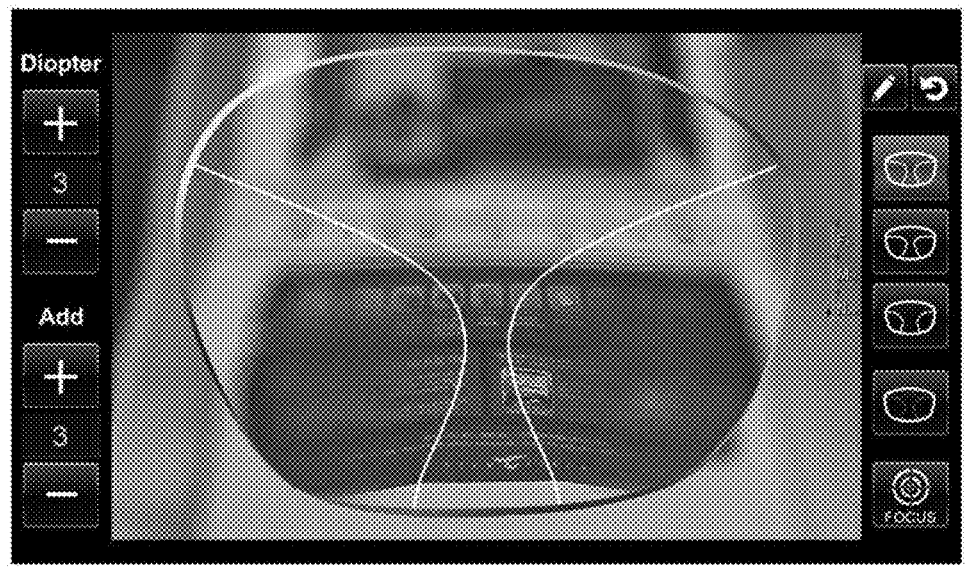
FIGS. 22 to 24 are views showing output states of an augmented reality image where an image of a progressive multi-focal lens is disposed to be overlapped with a background image of a real surrounding environment corresponding to a short distance, a medium distance and a far distance respectively.
Figure 23:
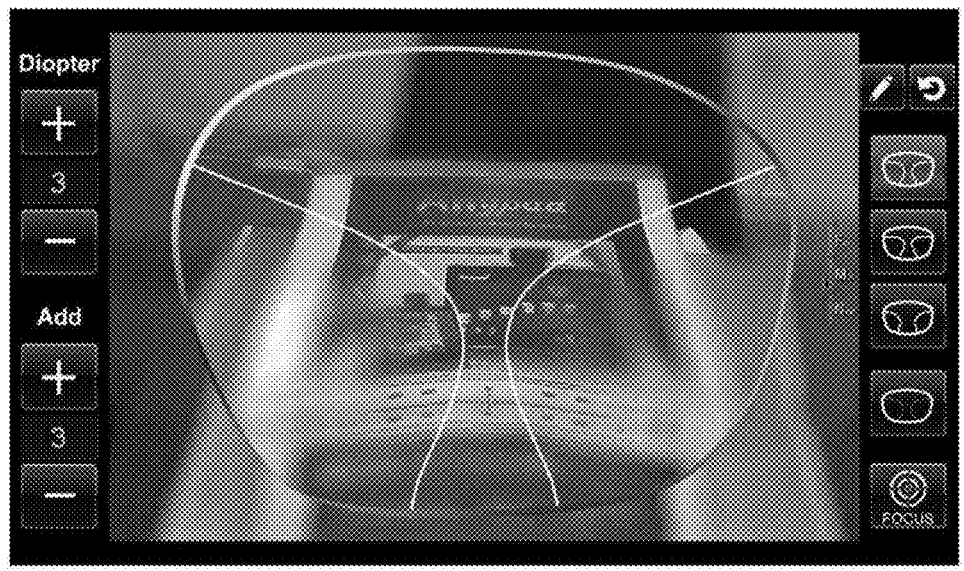
Figure 24:
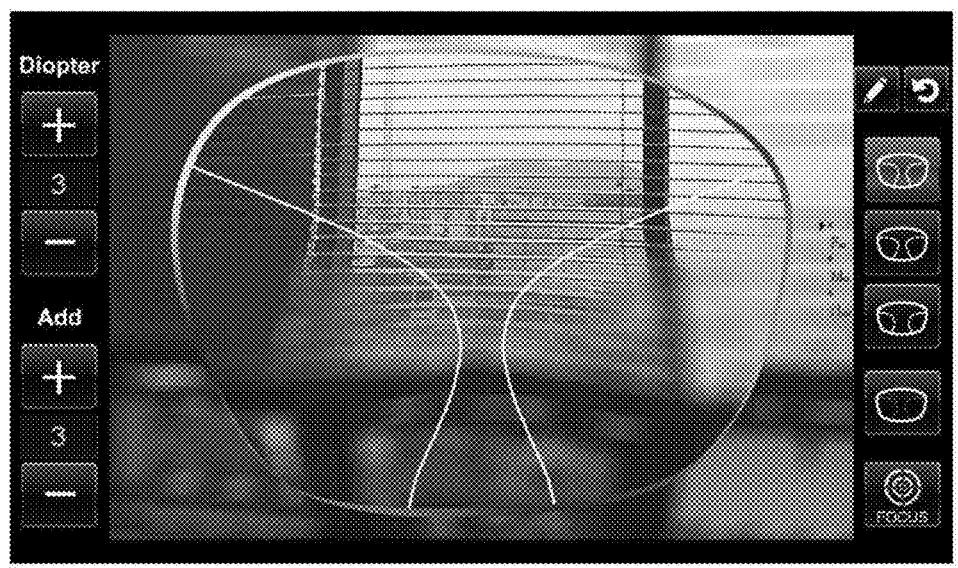
Figure 25:
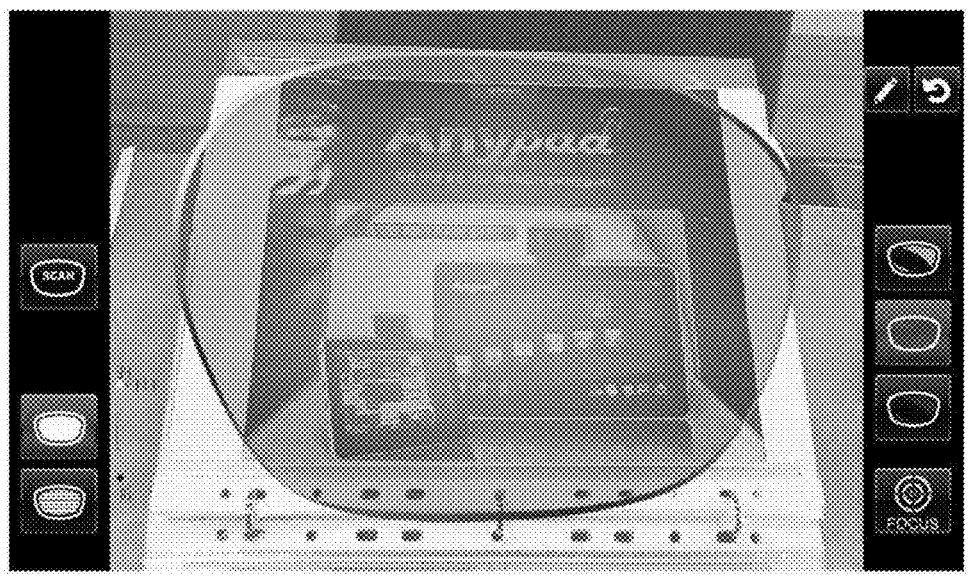
FIGS. 25 and 26 are views showing output states of an augmented reality image where images of general and polarizing sunglass (a Brown family) lenses are disposed to be overlapped with a background image of a real surrounding environment.
Figure 26:
Figure 27:
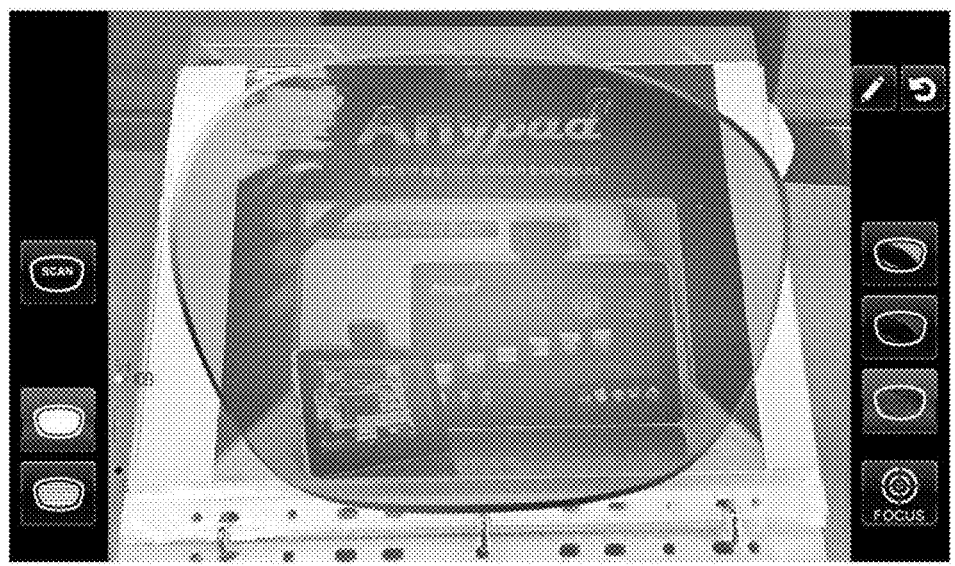
FIGS. 27 and 28 are views showing output states of an augmented reality image where images of general and polarizing sunglass (a Rayban family) lenses are disposed to be overlapped with a background image of a real surrounding environment.
Figure 28:
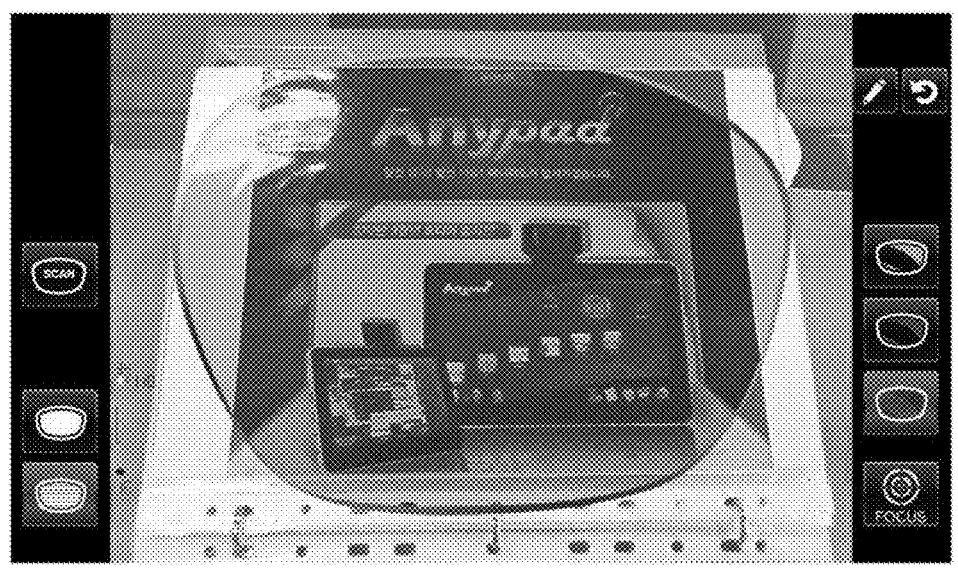

Hereinafter, FIGS. 11 to 28 show a variety of augmented reality images implemented on the screen module 10 of the portable tablet computer 100 in the process of manufacturing a custom-tailored spectacle lens using augmented reality according to an embodiment of the present invention. Specifically, FIG. 11 is a view showing an output state of an augmented reality image where an image of a general lens is disposed to be overlapped with a background image of a real surrounding environment, FIG. 12 is a view showing an output state of an augmented reality image where an image of a photochromic lens is disposed to be overlapped with a background image of a real surrounding environment, FIGS. 13 to 21 are views showing output states of an augmented reality image where an image of a photochromic lens applied with all or some of gradation effects is disposed to be overlapped with a background image of a real surrounding environment, FIGS. 22 to 24 are views showing output states of an augmented reality image where an image of a progressive multi-focal lens is disposed to be overlapped with a background image of a real surrounding environment corresponding to a short distance, a medium distance and a far distance respectively, FIGS. 25 and 26 are views showing output states of an augmented reality image where images of general and polarizing sunglass (a Brown family) lenses are disposed to be overlapped with a background image of a real surrounding environment, FIGS. 27 and 28 are views showing output states of an augmented reality image where images of general and polarizing sunglass (a Rayban family) lenses are disposed to be overlapped with a background image of a real surrounding environment.

In the method of simulating a spectacle lens using augmented reality according to an embodiment of the present invention, a user who desires to purchase a vision correction product may wear spectacle lenses precisely corrected using a computer device through a virtual experience, and inconvenience of frequently replacing various spectacle lenses when taking an eye examination is considerably mitigated. An effect of wearing a variety of vision correction products in a short time period can be experienced, and it is expected to be able to select an optimized custom-tailored vision correction product. Particularly, in manufacturing a functional spectacle lens which has complicated manufacturing steps and requires a precise examination, such as a progressive multi-focal lens, a coating lens, a color lens, a myopia progress suppression lens, an eye fatigue relieve lens or the like, it is expected that a precise product can be manufactured, and manufacturing time can be greatly reduced.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of simulating a lens using augmented reality, which uses a portable tablet computer applied with a screen module having an input and out function, a camera module for photographing a surrounding environment in real-time, a motion sensor module for sensing a motion pattern according to handling of a user, and an operation module for storing and/or processing information received from the screen module, the camera module and the motion sensor module, the method comprising the steps of:

acquiring information on an image of a real surrounding environment by photographing the real surrounding environment using the camera module;

acquiring information on a motion of visually recognizing an object of the user by sensing a motion pattern according to handling of the user through the motion sensor module;

creating a virtual custom-tailored spectacle lens image based on the information on the motion of visually recognizing an object of the user through the operation module; and disposing the virtual custom-tailored spectacle lens image to be overlapped with the real surrounding environment image and outputting a vision adjustment effect image based on the virtual custom-tailored spectacle lens image.

2. The method according to claim 1, wherein said acquiring information on a motion of visually recognizing an object of the user comprises:

acquiring information on a distance between eyes of the user and the portable tablet computer by sensing a motion pattern of the user approaching the eyes of the user toward a direction of the portable tablet computer or pulling the portable tablet computer toward a direction of the eyes of the user in order to confirm an image outputted on the screen module; and acquiring information on a position of a face of the user by sensing a motion pattern of the user moving the face of the user up and down or left and right in order to confirm an image outputted on the screen module.

3. The method according to claim 1, wherein the virtual custom-tailored spectacle lens image is implemented in a form of two-dimension 2D or three-dimension 3D.

4. The method according to claim 1, wherein the virtual custom-tailored spectacle lens image is selected from a group of a progressive lens image, a progressive multi-focal lens image, a spherical lens image, an aspherical lens image, a double-sided aspherical lens image, a myopia progress suppression lens image, an eye fatigue relieve lens image, a color lens image, and a coating lens image.

5. The method according to claim 1, wherein said outputting a vision adjustment effect image based on the virtual custom-tailored spectacle lens image comprises additionally outputting a virtual background image or a function handling button image stored in the portable tablet computer.

6. The method according to claim 1, wherein the portable tablet computer is additionally applied with an optical sensor module.

7. The method according to claim 6, wherein the optical sensor module is implemented in an embedded type embedded in the portable tablet computer or implemented in an external type connected to an audio connection port of the portable tablet computer.

8. The method according to claim 6, further comprising:
acquiring information on external light by sensing the external light through the optical sensor module; and creating the virtual custom-tailored spectacle lens image based on the information on external light through the operation module.

9. The method according to claim 5, wherein the virtual custom-tailored spectacle lens image is a discoloration lens image or a polarization lens image.

10. The method according to claim 1, wherein the lens is a spectacle lens.

11. A method of simulating a lens using augmented reality, comprising:

acquiring first information on an image photographed by a camera module;

acquiring second information on a motion of visually recognizing an object of a user by sensing a motion pattern according to handling of the user, with a motion sensor module;

creating a virtual custom-tailored spectacle lens image based on the second information by an operation module; and disposing the virtual custom-tailored spectacle lens image to be overlapped with the image photographed by the camera module to make a vision adjustment effect image and outputting the vision adjustment effect image on a screen module.

12. The method according to claim 11, wherein at least one of the camera module, the motion sensor module, the operation module and the screen module are drivably connected to a tablet.

13. The method according to claim 11, wherein the camera module, the motion sensor module, the operation module and the screen module are embedded in a tablet.

14. The method according to claim 11, wherein said acquiring the second information comprises:

outputting an image on the screen module; and acquiring the second information on a distance between eyes of the user and the screen module by sensing a motion pattern of the user when the user moves himself or herself or moves the screen module in order to confirm the image outputted on the screen module.

15. The method according to claim 11, wherein said acquiring the second information comprises:

outputting an image on the screen module; and acquiring the second information on a position of a face of the user by sensing a motion pattern of the user when the user moves the face of the user in order to confirm an image outputted on the screen module.

16. The method according to claim 11, wherein the second information comprises information on an eye rotation and a length of corridor motion pattern.

17. The method according to claim 11, wherein said acquiring the second information further comprises:

acquiring external light information by sensing external light with an optical sensor module; and creating the virtual custom-tailored spectacle lens image based on the second information containing the external light information with the operation module.

18. The method according to claim 11, wherein the lens is a spectacle lens.

19. The method according to claim 11, wherein the lens is a contact lens.

20. The method according to claim 11, wherein the virtual custom-tailored spectacle lens image comprises a plurality of virtual custom-tailored spectacle lens images selected from a group of a progressive lens image, a progressive multi-focal lens image, a spherical lens image, an aspherical lens image, a double-sided aspherical lens image, a myopia progress suppression lens image, an eye fatigue relieve lens image, a color lens image, and a coating lens image.

* * * * *